United States Patent [19]

Watanabe

[11] Patent Number: 5,189,289
[45] Date of Patent: Feb. 23, 1993

[54] DISTINGUISHING BAR CODE TYPES BY COMPARING BAR BLOCK SIZES

[75] Inventor: Mitsuo Watanabe, Yokohama, Japan

[73] Assignee: Fujitsu Limited, Kawasaki, Japan

[21] Appl. No.: 640,358

[22] PCT Filed: May 17, 1990

[86] PCT No.: PCT/JP90/00625
§ 371 Date: Jan. 17, 1991
§ 102(e) Date: Jan. 17, 1991

[87] PCT Pub. No.: WO90/14638
PCT Pub. Date: Nov. 29, 1990

[30] Foreign Application Priority Data

May 17, 1989 [JP] Japan .................... 1-123402

[51] Int. Cl.⁵ .......................... G06K 5/00; G06K 7/14; G06K 7/016
[52] U.S. Cl. ...................................... 235/437; 235/462
[58] Field of Search ............... 235/454, 462, 463, 436, 235/437

[56] References Cited

U.S. PATENT DOCUMENTS

| | | | |
|---|---|---|---|
| 3,932,840 | 1/1976 | Hanchett | 340/146.3 Z |
| 4,329,574 | 5/1982 | Jordan, Jr. | 235/463 |
| 4,717,818 | 1/1988 | Broockman et al. | 235/462 |
| 4,746,789 | 5/1988 | Gieles et al. | 235/463 |
| 4,963,719 | 10/1990 | Brooks et al. | 235/462 |

FOREIGN PATENT DOCUMENTS

| | | |
|---|---|---|
| 0036951 | 10/1981 | European Pat. Off. . |
| 2166574 | 5/1986 | European Pat. Off. . |
| 52-63625 | 5/1977 | Japan . |
| 52-96827 | 8/1977 | Japan . |
| 53-120339 | 10/1978 | Japan . |
| 1519256 | 7/1978 | United Kingdom ............. 235/463 |
| 8802521 | 4/1988 | World Int. Prop. O. .......... 235/463 |

OTHER PUBLICATIONS

IBM Technical Disclosure Bulletin, vol. 17, No. 7, Dec. 1974, "Code Validation in an Optical Bar-Code Reader", by R. A. Brecke et al., pp. 2080–2081.

IBM Technical Disclosure Bulletin, vol. 27, No. 7A, Dec. 1974, "Utilization of Data from Partial Reads of UPC Label", by E. C. Broockman, pp. 3720–3721.

Primary Examiner—John W. Shepperd
Assistant Examiner—Edward Sikorski
Attorney, Agent, or Firm—Staas & Halsey

[57] ABSTRACT

A bar code reading apparatus includes a bar code reader for generating, in a single operation, plural pieces of bar block data corresponding to a bar code having a number of digits which is a predetermined standard value, for example, 8 or 13. A detector detects the numbers of digits in each piece of bar block data generated by the bar code reader 11. A four digit memory and a six digit memory are used to store bar block data having four digits and six digits, respectively. A comparator detects whether or not the four digit memory and six digit memory each store bar block data. Each piece of bar block data output from the bar code reader 11 is stored in either the four digit memory or the six digit memory depending upon the number of digits detected by the digit detector. If the comparator determines that bar block data is stored in both the four digit memory and the six digit memory, then it is determined that the bar code reading operation is erroneous.

38 Claims, 11 Drawing Sheets

CONFIGURATION OF BUFFER (18)

Fig. 8

CONFIGURATION OF SIX-DIGIT MEMORY

RIGHT BLOCK (DATA R-6)      LEFT BLOCK (DATA L-6)

CONFIGURATION OF FOUR-DIGIT MEMORY

RIGHT BLOCK (DATA R-4)      LEFT BLOCK (DATA L-4)

DISTINGUISHING BAR CODE TYPES BY COMPARING BAR BLOCK SIZES

BACKGROUND OF THE INVENTION

1. Technical Field

The present invention relates to a bar code reading method and apparatus.

2. Background Art

Labels having bar codes are classified into, for example, two kinds, i.e., eight-digit labels and 13-digit labels. The eight-digit label is constructed by two blocks of left and right each having four digits. The 13-digit label is constructed by two blocks of left and right each having six digits. The left block has seven digits including two flag digits for indicating a figure.

In reading the 13-digit label, the six-digit block is sometimes read as a four-digit block depending on a way of beam scanning. As will be described in detail later, a prior art technique has a problem of erroneously reading the 13-digit label as the eight-digit label.

SUMMARY OF THE INVENTION

In view of the problems in the prior art, the present invention has an object to provide a bar code reading method and apparatus that can reduce a read error rate. More particularly, the present invention relates to a method and apparatus for distinguishing labels of, for example, the EAN-8 and EAN-13 type.

DESCRIPTION OF THE PREFERRED EMBODIMENT

To understand the present invention more clearly, a conventional bar code reading system and its problems will be explained with reference to FIGS. 1 to 3.

Figure 1:
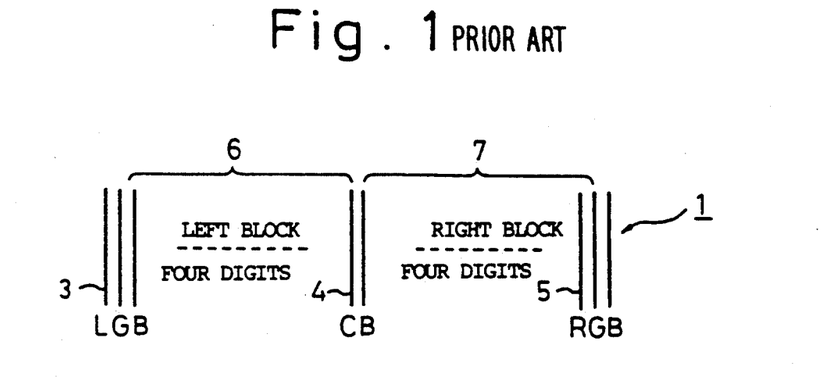
FIG. 1 is a diagram of an eight-digit label.
Figure 2:
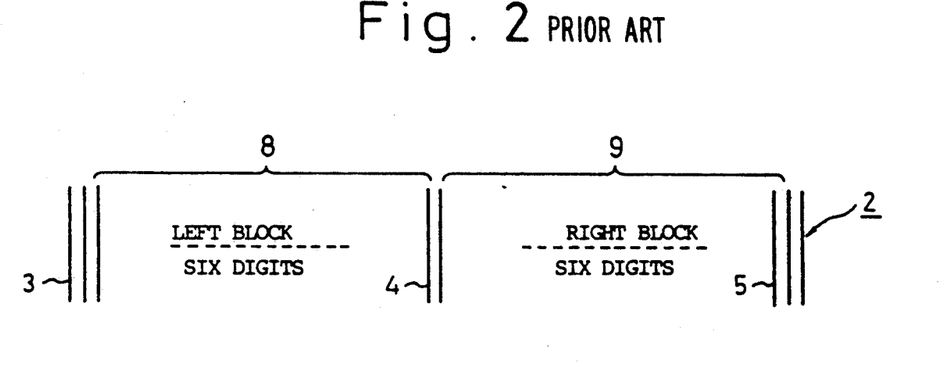
FIG. 2 is a diagram of a 13-digit label.
Figure 3:
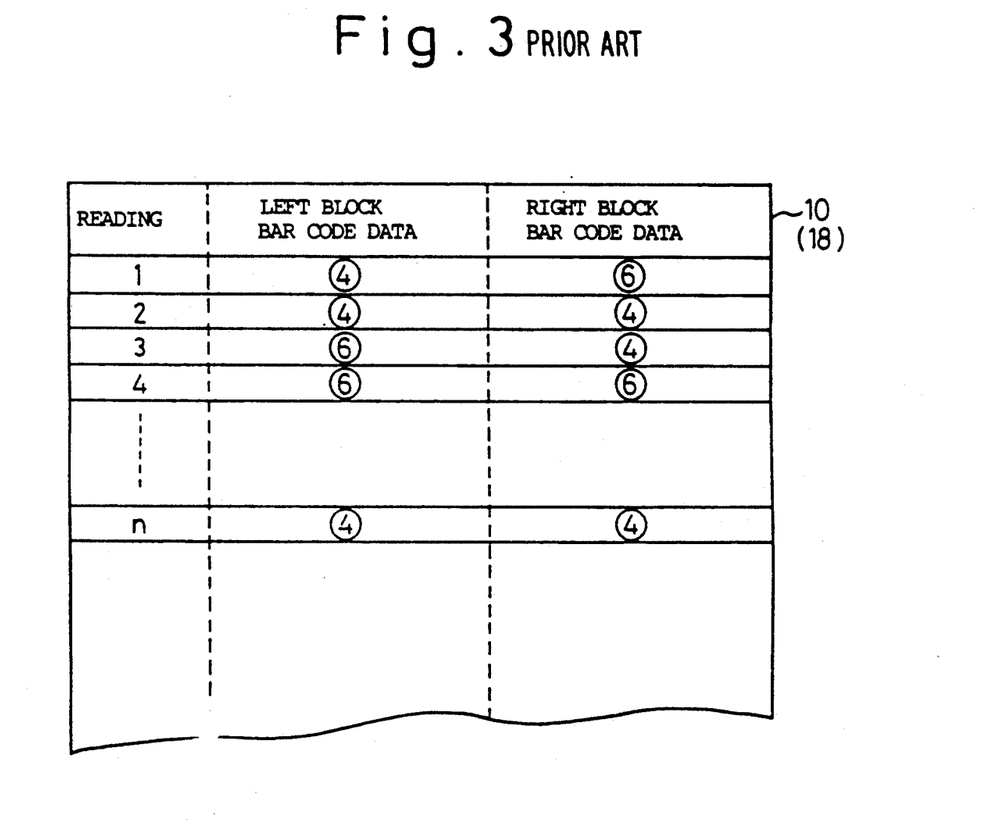
FIG. 3 is a chart showing data in a buffer memory.

Labels having bar codes are classified into two kinds, i.e., an eight-digit label 1 shown in FIG. 1 and a 13-digit label 2 shown in FIG. 2.

As shown in FIG. 1, the eight-digit label 1 has a left guard bar (LGB) 3, a center bar (CB) 4, and a right guard bar (RGB) 5, and is constructed by two blocks 6 and 7. Each of the blocks 6 and 7 comprises data of four digits where four is a standard value.

As shown in FIG. 2, the 13-digit label 2 has a left guard bar 3, a center bar 4, and a right guard bar 5, and is constructed by two blocks 8 and 9. Each of the two blocks 8 and 9 is constructed by data having a standard value of six digits.

The eight-digit label 1 and 13-digit label 2 are read as follows:

A bar code reader converts a bar code into a digital signal which is demodulated and stored in a buffer memory. Since the scanning speed of a light beam is high, the bar code printed on a bar code label is usually read by the bar code reader several times in a single reading operation in which the bar code is traced once from the right to the left or from the left to the right. The above-mentioned buffer memory 10, therefore, stores, in one reading operation, plural pairs of data, each pair of data consisting of the left and right blocks, as shown in FIG. 3. FIG. 3 shows that the 13-digit label 2 has been scanned "n" times in one reading operation, and that the buffer memory 10 is storing "n" pairs of data. In the figure, each circled numeral denotes the number of actually read digits. For example, in the first scan, four digits are read from the left block which originally has six digits, and six digits are correctly read from the right block. Each bar code data of the left or right block in the buffer memory 10 is provided with a flag indicating the number of digits (see FIG. 7). A CPU discriminates the number of digits of each demodulated data stored in the buffer memory 10 by recognizing the number of digits indicated by the flag, and stores the data separately in a four-digit memory or a six-digit memory, respectively.

If the number of digits of the demodulated data is not four or six, the CPU determines it as a reading error and removes the data from the left and right blocks. The CPU carries out a modulus check and a parity check on the data stored in the four-digit or six-digit memory and picks up correct data that have successfully passed the checks. Thereafter, the CPU retrieves a pair of left and right data (i.e., each data in the left block and the right block) having the same number of digits among the data that have successfully passed the modulus and parity checks. The CPU then sends the pair of data to a higher device (for example, a data processing unit having a processor for processing and managing bar code data) through an interface.

This sort of conventional bar code reading system, however, has a problem of reading six-digit data as four-digit data both in the left and right blocks of the 13-digit label depending on a way of beam scanning (the second and "n"th readings in FIG. 3), and storing the read data in the four-digit memory, resulting in that the 13-digit label is erroneously read as the eight-digit label.

In view of the above-mentioned problem, the present invention is based on an idea that all data stored in the buffer memory must be rejected as an error if four-digit data is found in a buffer memory after reading a 13-digit label, and has an object to reduce a read error rate in bar code reading.

Figure 4:
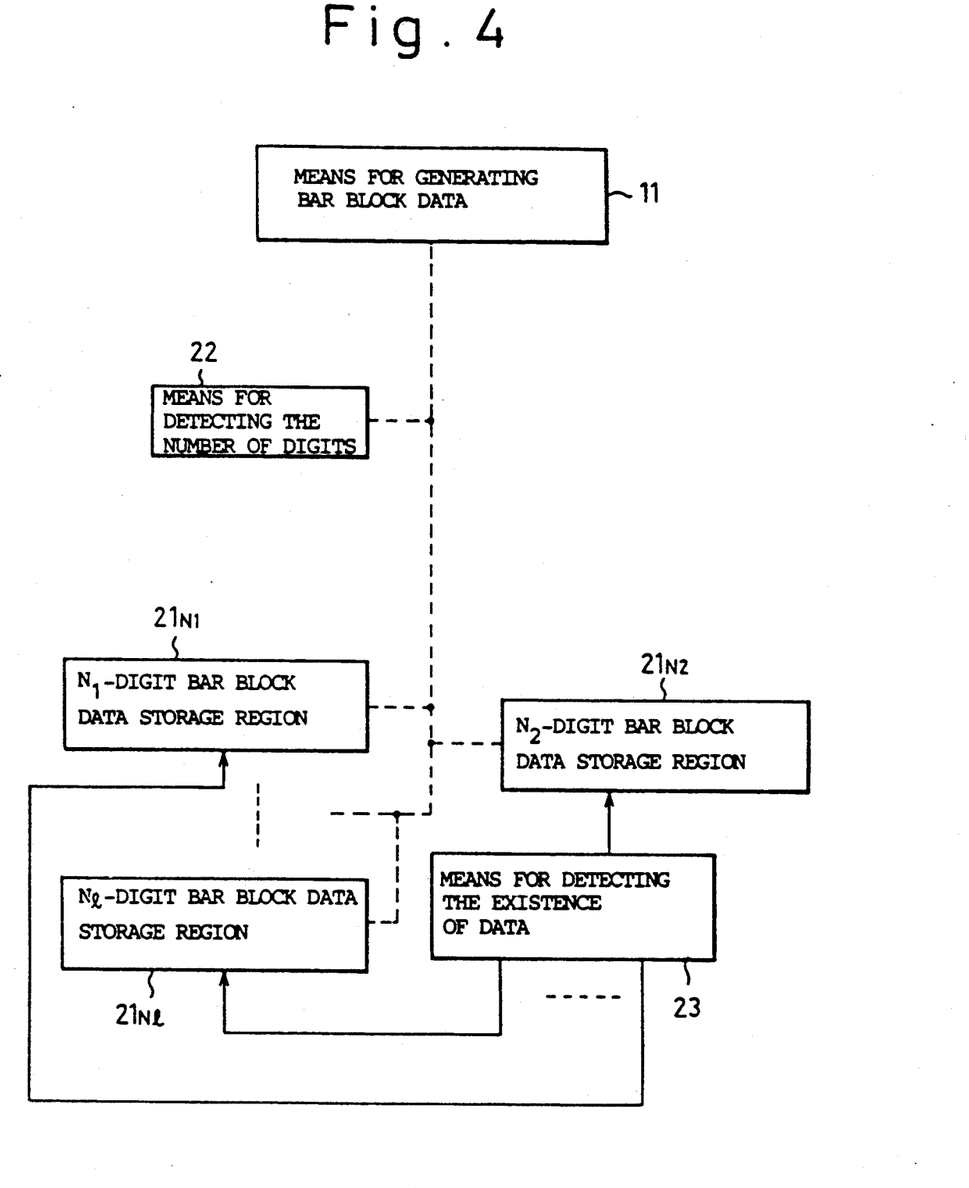
FIG. 4 is a block diagram showing a principle of an aspect of the present invention.

FIG. 4 is a block diagram showing a bar code reading system according to an aspect of the present invention.

In FIG. 4, numeral 11 is a bar block data generating means for generating a plurality of bar block data in one reading operation of a bar code; 21N1, 21N2, ..., 21Nl are bar block data storage regions for storing bar code data of left and right bar code blocks, constructing bar codes of bar code labels, according to the numbers of digits N1, N2, ..., Nl of the bar code data; 22 is a number of digits detecting means for detecting the number of digits; and 23 is a data existence detecting means for detecting whether or not data exists in at least one storage region 21Ni (i=1, 2, ..., or l) among the bar block data storage regions 21N1, 21N2, ..., 21Nl.

In FIG. 4, the bar block data generating means 11 generates a plurality of bar block data in one reading operation of a bar code whose number of digits is one of a plurality of predetermined standard values.

The means 22 detects the number of digits Ni (i=1, 2, ..., l) of each piece of bar block data, and stores the bar block data in one bar block data storage region 21Ni corresponding to the number of digits.

After every bar block data obtained in one reading operation is stored in either one of the bar block data storage regions, the data existence detecting means 23 judges whether or not data exist in a plurality of the bar block data storage regions. Only when there are data in a single bar block data storage region and there is no data in the other bar block data storage regions, is it judged that the data have been correctly read, and the higher device is informed of this determination. If there are data in a plurality of the bar block data storage regions, it is judged to be a read error, and the contents of the bar block data storage regions are cleared. Instead of the bar block data storage regions 21Ni, it is possible to arrange means for storing the numbers of bar block data for respective numbers of digits. In this case, if the means for storing the numbers of bar block data are storing the numbers of bar block data having different numbers of digits, it is judged to be a read error, and the contents of the means for storing the numbers of bar block data are cleared.

For example, when the label indicating a bar code is either a 13-digit label or an eight-digit label, in the example of FIG. 4, a four-digit storage region 21N1 and a six-digit storage region 21N2 are provided as the bar block data storage regions. In a bar code reading operation, when at least one of left and right blocks is correctly read as a six-digit bar code, the six-digit bar code data is stored only in the storage region 21N2 but not in the storage region 21N1. Therefore, if the data existence detecting means 23 detects that the storage region 21N1 has no data, it is judged that the read bar code is of 13 digits. Namely, this bar code will never be erroneously read as an eight-digit bar code, thus reducing a read error rate.

Figure 5:
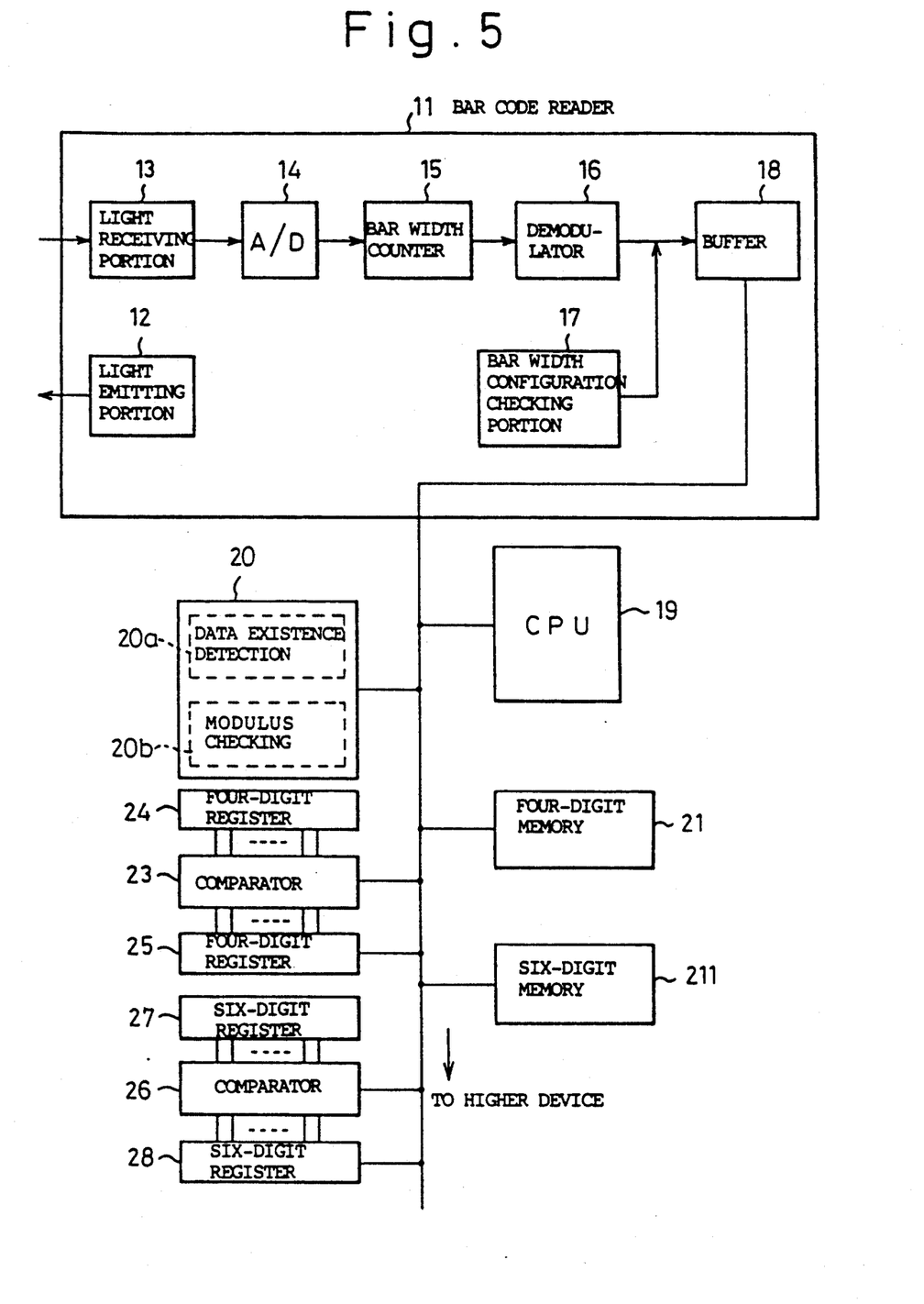
FIG. 5 is a block diagram showing an embodiment of the present invention.

FIG. 5 is a block diagram of an embodiment of the present invention corresponding to the aspect of FIG. 4.

In FIG. 5, 11 is a bar code reader, and 12 a light emitting portion disposed inside the bar code reader 11. The light emitting portion 12 emits a laser beam. The laser beam is formed into a predetermined beam pattern by a polygon motor (not shown), and reflected by a bar code. It is assumed that there are only eight-digit bar codes and 13-digit bar codes. Numeral 13 is a light receiving portion for receiving collected reflected light and converting it into an electric signal.

Numeral 14 is an A/D converter that differentiates an output of the light receiving portion 13 and converts it into a digital signal. Numeral 15 is a bar width counter for quantization. The bar width counter 15 counts the width of each white or black bar of the bar code represented by a digital signal and provides the counted value.

Numeral 16 is a demodulator for demodulating a digital signal provided by the bar width counter 15 into a digital signal representing a decimal numeral. Numeral 17 is a bar width configuration checking portion for checking the configuration of a bar width at the same time with the demodulation, and storing only eight-digit or 13-digit data in a buffer memory 18. The buffer memory 18 stores, therefore, only the demodulated eight-digit or 13-digit data whose bar width configurations have been checked.

The light emitting portion 13, A/D converter 14, bar width counter 15, demodulator 16, and bar width configuration checking portion 17 form the bar code data generating means shown in FIG. 4.

Numeral 19 is a central processing unit (CPU). A memory 20 stores programs necessary for operating the CPU, and a program 20b for carrying out the modulus check. A bar code data storage region comprises a four-digit memory 21 and a six-digit memory 211. The memory 20 further stores a data existence detecting program 20a. The CPU 19 discriminates the number of digits given to left or right block data read out of the buffer memory 18, and stores the data in the four-digit memory 21 or the six-digit memory 211, respectively, according to the number of digits. The CPU 19 uses the modulus check program 20b stored in the memory 20, and carries out the modulus check on the data stored in the four-digit memory 21 or the six-digit memory 211, and picks up data that have successfully passed the check. Numeral 23 is a four-digit comparator which compares data stored in a register 24 storing in advance four Os with data which has passed the modulus check and is stored in a register 25. The data in the register 25 is one that has been read out of the four-digit memory 21. If all digits match one another in the comparison, i.e., if the data in the four-digit memory 21 are all Os, the comparator 23 provides "1", and if mismatch occurs even in one digit, it outputs "0". Numeral 26 is a six-digit comparator which compares data stored in a register 27 storing in advance six Os with data which has passed the modulus check and is stored in a register 28. The data in the register 28 is one that has been read out of the six-digit memory 211. If all digits match one another, the comparator 26 provides "1", and if mismatch occurs even in one digit, it outputs "0". Using the comparator 23, registers 24 and 25, comparator 26, registers 27 and 28, and data existence detecting program 20a, the CPU 19 detects whether or not four-digit data or six-digit data exist. Only when no four-digit data exists, the CPU 19 sends six-digit data to the higher device. In this way, a pair of finally correct six-digit data are sent to the higher device (for example, a data processor for processing and managing bar code data) through an interface.

In reading a bar code comprising four-digit bar code in one block, six-digit data will never be read so that it is not necessary to detect the existence of six-digit data.

Next, an operation will be explained in detail.

In a single reading operation, a bar code is scanned "n" times. A reflected beam from the bar code is converted into an electric signal by the light receiving portion 13, and then into a digital signal by the A/D converter 14. The bar width counter 15 counts a bar width of the digital signal, and the demodulator 16 demodulates the counted value into a digital signal representing a decimal numeral. At the same time, the bar width configuration checking portion 17 checks a configuration of the bar width, and only the data that has four or six digits in one block is stored in the buffer memory 18. The format of the data stored in the buffer memory 18 is the same as that of FIG. 3.

If the read bar code is of an eight-digit label, each block of the bar code comprises four-digit data, which will not be read as six-digit data irrespective of way of scanning, so that, among bar code data stored in the buffer memory 18, all four-digit data that have successfully passed a modulus check are stored in the four-digit memory 21. In carrying out the modulus check, the CPU 19 uses an eight-digit modulus check program.

Since the six-digit memory 211 has no data, the comparator 26 provides a signal of "1". Namely, since no data is input from the six-digit memory 211 to the register 28, the register 28 has an initial value comprising six digits of 0s. The contents of the register 28 match the contents of the register 27 in which 0s are stored in advance, so that the comparator 26 provides the signal of "1" indicating that there is not six-digit data. According to this signal of "1", it is judged that the read bar code has eight digits.

If the read bar code is of a 13-digit label, it may happen that six-digit data of one block is read as four-digit data depending on a way of beam scanning, and stored in the four-digit memory 21. Therefore, after a single reading operation, the buffer memory 18 may contain a mixture of six-digit data and four-digit data as shown in FIG. 3.

In the present embodiment, in reading the 13-digit label, it is judged whether or not the four-digit memory 21 has data. If it has, all data in the buffer memory 18 are judged to be wrong and cleared. Namely, in the example of FIG. 3, since the first, fourth, . . . , "n"th data stored in the buffer memory 18 are six-digit data, these six-digit data are stored in the six-digit memory 211 by the CPU 19. The CPU 19 uses the data existence detecting program 20a to read four-digit data from the four-digit memory 21 and stores the same in the register 25. The comparator 23 compares the contents of the register 25 with the contents of the register 24 digit by digit. The contents of the register 24 are all 0s. Since the four-digit data in the register 25 involves a numeral that is not 0, the compared result does not match, and therefore, the comparator 23 provides a signal of "0". Consequently, the CPU 19 can detect that the four-digit memory 21 has some four-digit data.

As a result, it is judged that the reading of the bar code of the 13-digit label was wrong, and the contents of the buffer memory 18, four-digit memory 21, and six-digit memory 211 are all cleared.

In summary, the CPU 19 carries out the modulus check with use of the eight-digit modulus program for data stored in the four-digit memory 21, and a 13-digit modulus program for data stored in the six-digit memory 211 (these programs are stored as modulus check programs in the memory 20). The CPU 19 retrieves four-digit data among data that have successfully passed the modulus check. Since it has been judged, as described before, that the four-digit memory 21 has data and the reading operation of the 13-digit bar code is wrong, the CPU 19 clears the data in the buffer memory 18, six-digit memory 211, and four-digit memory 21.

In this way, the data that may be erroneously recognized as an eight-digit label are rejected. Namely, a bar code of a 13-digit label will never be recognized as a bar code of an eight-digit label.

Figure 6:
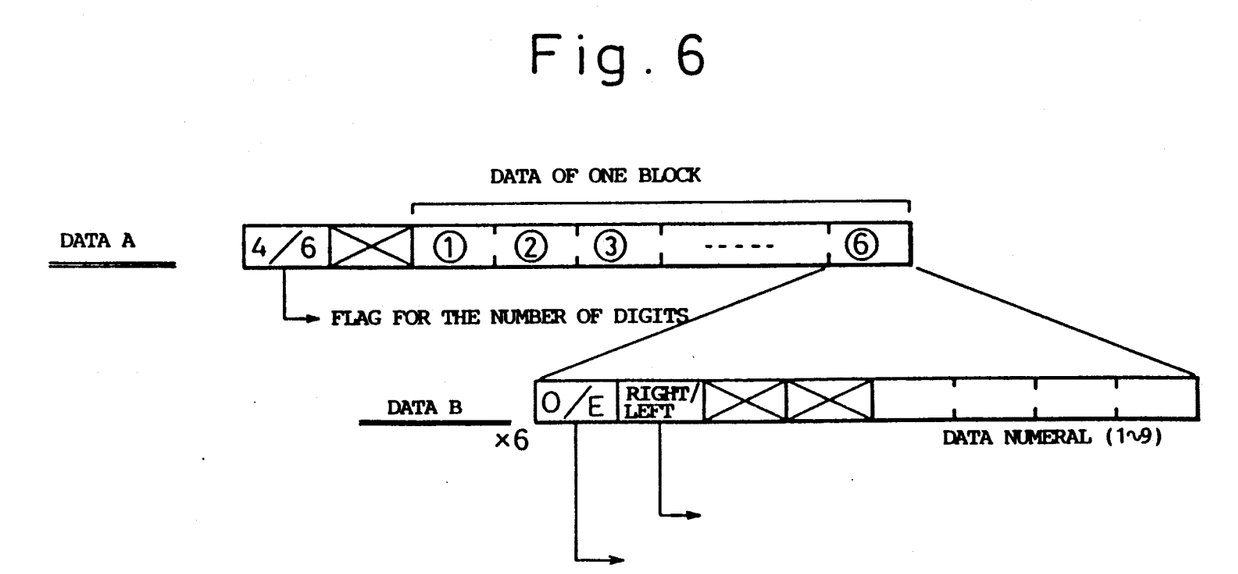
FIG. 6 is a diagram illustrating a configuration of data provided by a demodulator 16.

FIG. 6 is a view showing the format of one block data stored in the buffer memory 18. In the figure, the one block data has six digits from 1 to 2. At the head of this data (referred to as data A), a flag indicating the number of digits, i.e., 6 is arranged. In the data A, each of the digits is illustrated as data B, which comprises a parity flag for identifying an even parity or an odd parity, a left/right flag for identifying left block data or right block data, and digital data numerals for indicating a data numeral value (one of 1 to 9) of the block. If the data A is four-digit data, the flag for the number of digits is 4, and the data of 1 to 2 are stored. One reading operation provides a plurality of data each with the format of the data A of FIG. 6. Each data is provided with the flag of 4 or 6 for the number of digits, and stored in the buffer memory 18.

Figure 7:
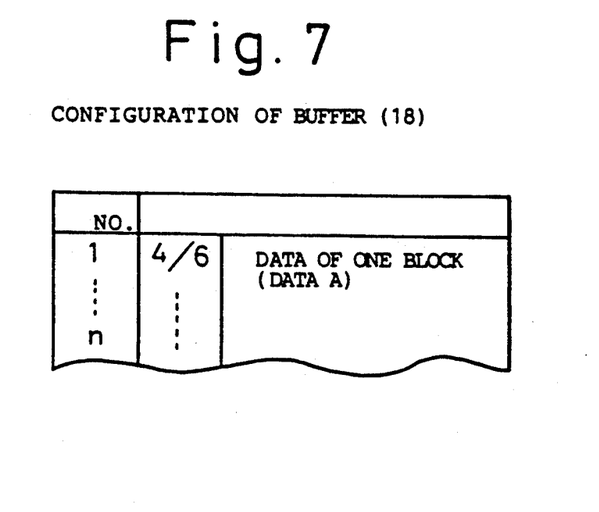
FIG. 7 is a diagram view showing a configuration of data stored in a buffer memory.

FIG. 7 is a view showing the data A stored in the buffer memory 18 after one reading operation. As shown in the figure, each of "n" scans is represented with data of one block and a corresponding flag indicating the number of digits.

Figure 8:
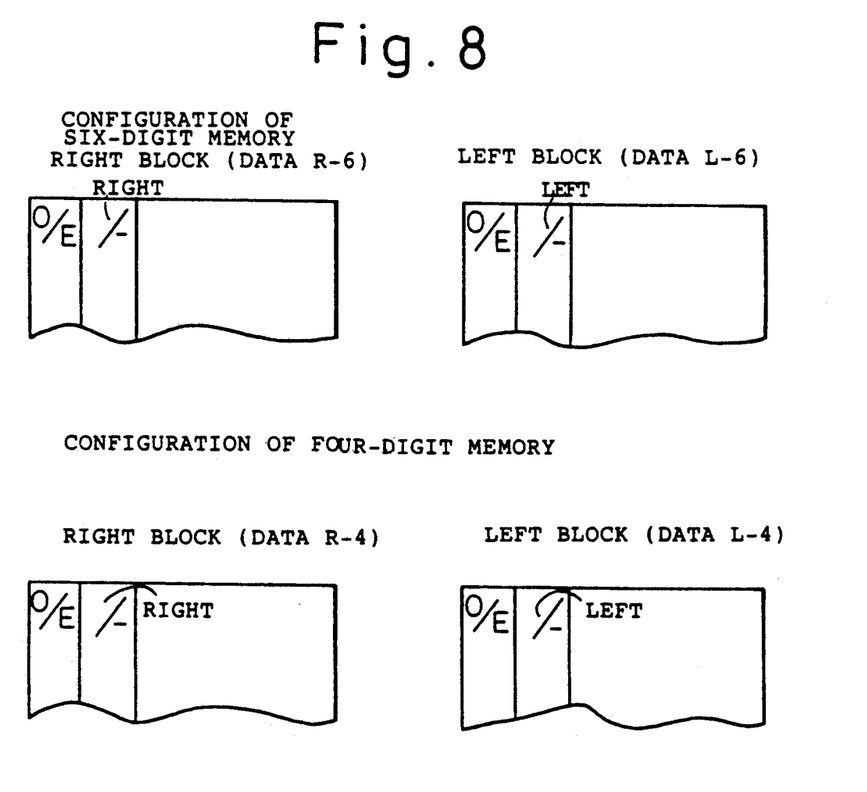
FIG. 8 is a diagram showing configurations of data stored in six-digit memory and four-digit memory.

FIG. 8 is a view showing the contents of left and right blocks of the six-digit memory 211 and four-digit memory 21. As shown in the figure, each memory stores even/odd parity flags, flags indicating left/right blocks, and bar code data.

Figure 9A:
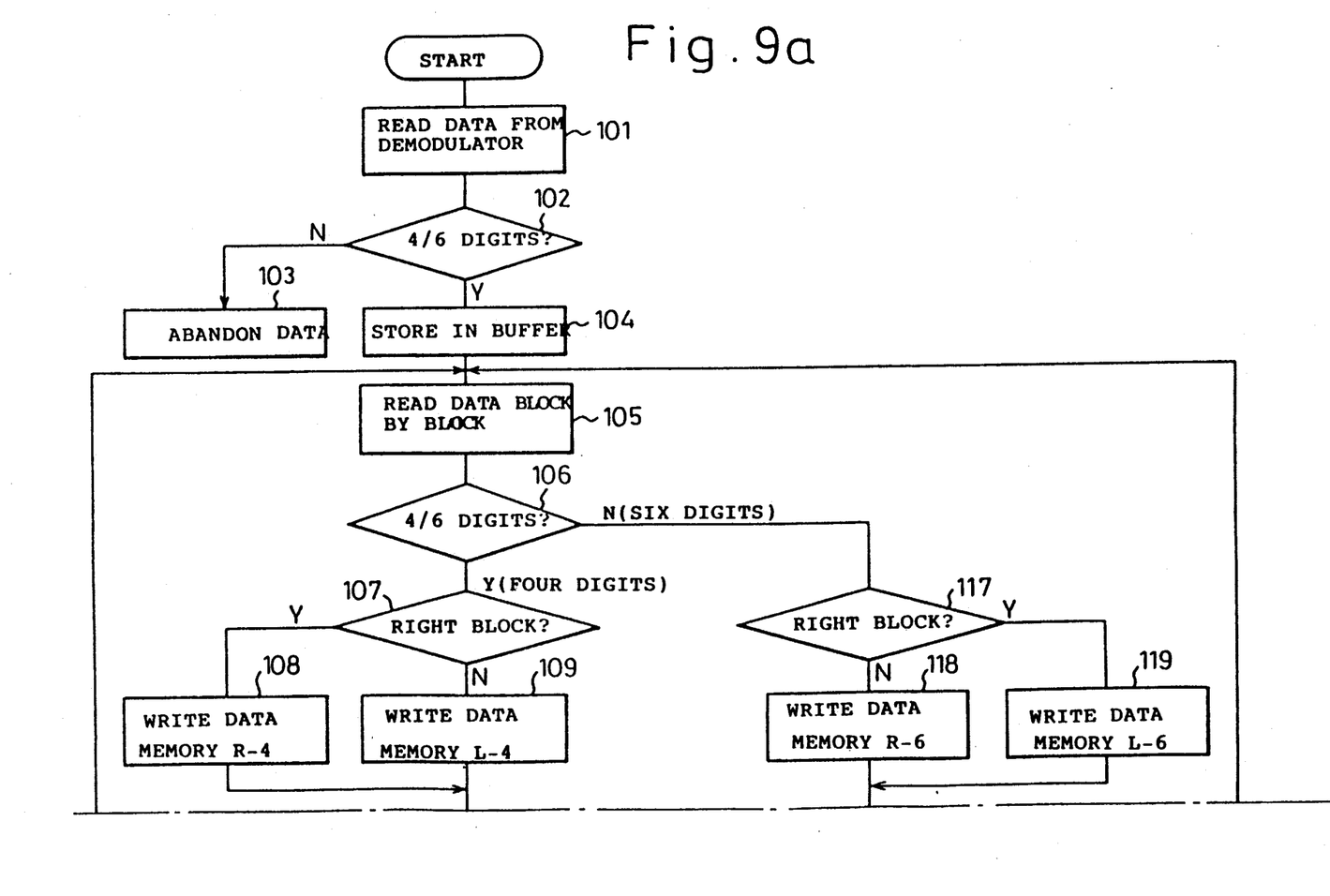
FIGS. 9a and 9b form a flowchart explaining an operation of a central processing unit shown in FIG. 6.
Figure 9B:
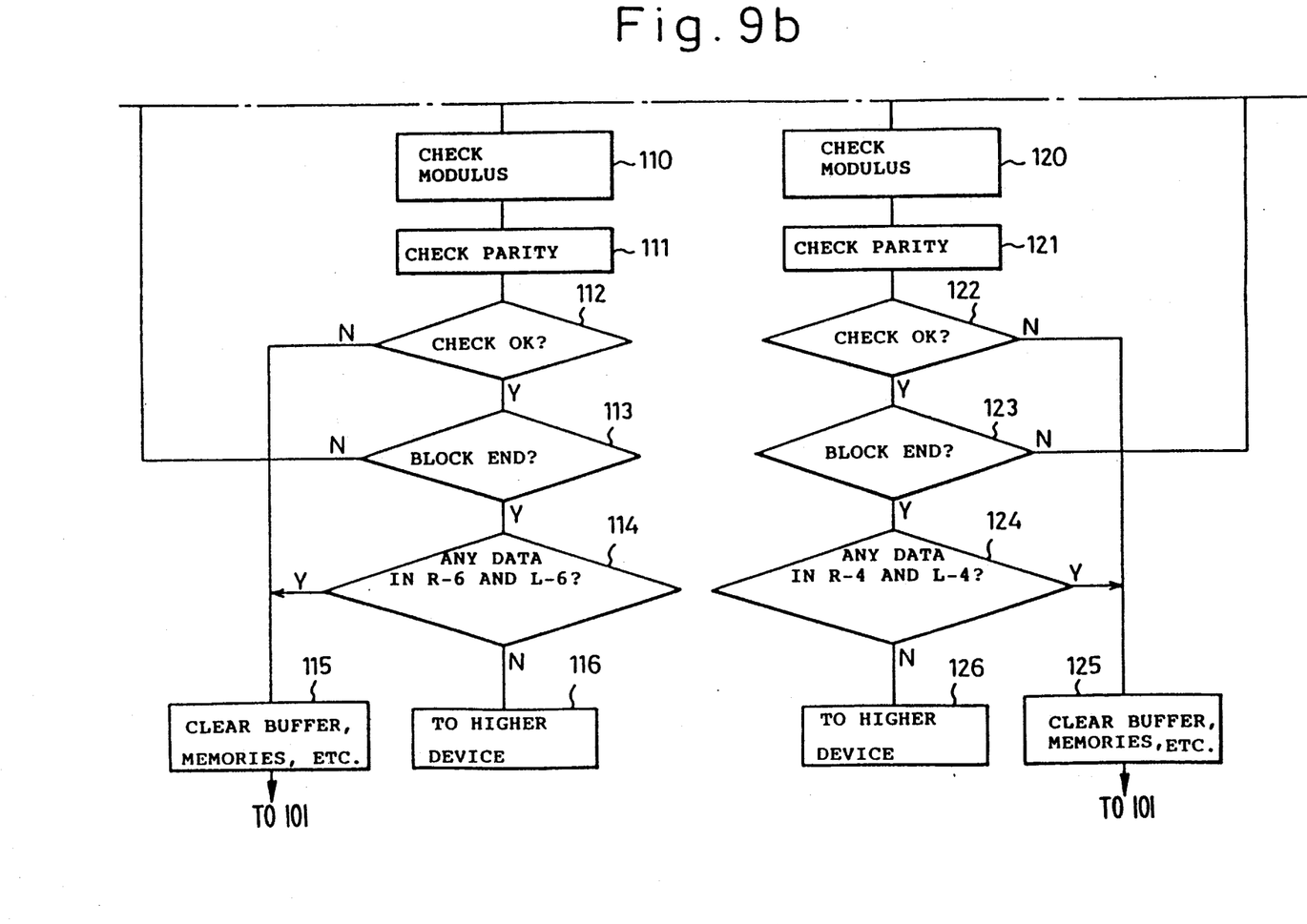

FIG. 9 is a flowchart explaining an operation of the CPU 19 shown in FIG. 5. In the figure, at a step 101, all data obtained by one reading operation from the demodulator 16 are read. In step 102, the bar width configuration checking portion 17 discriminates whether one block of data has four digits or six digits. In step 103, data other than the four-digit data and six-digit data are discarded. In step 104, the buffer memory 18 stores only the four-digit and six-digit block data. Consequently, the buffer memory 18 stores a total of "n" blocks of data on the left and right. Next, in step 105, the data is read block by block from the buffer memory 18, and in step 106, it is judged whether the read data has four digits or six digits according to a flag. If it is four-digit data, in step 107, it is judged whether the data is of a right block or of a left block according to a left/right flag. If it is right block data, in step 108, the data is stored in a right block region (referred to as a data memory R-4) of the four-digit memory 21. If it is left block data, in step 109, the data is stored in a left block region (referred to as a data memory L-4) of the four-digit memory 21. Then, in step 110, a modulus check is carried out, and in step 111, a parity check is carried out. If the results of these checks are not OK in step 112, it is judged that a read error has occurred, and in step 115, the contents of the buffer memory 18 and data memories R-4 and L-4 are cleared. Thereafter, the reading operation is repeated.

In the step 112, if the check is OK, it is judged whether or not the data block just read is the last block in the memory 18. If it is not the last block, the steps 105 to 113 are repeated. After the last block is processed through the steps 105 to 113, it is judged in step 114 whether or not there is data in the six-digit memory 211. In reading four-digit data, six-digit data are not read normally, so that, in step 116, the left and right block data of the four-digit memory 21 are informed to the upper device. In reading an eight-digit label, the step 114 may be omitted.

If, in the step 106, six-digit data is detected, steps 117 to 126 are executed. Namely, in the step 117, it is judged whether the read data is of a left block or a right block. If it is left block data, the data is stored in a left block region (data memory L-6) of the six-digit memory 211, and if it is right block data, it is stored in a right block region (data memory R-6) of the six-digit memory 211. A modulus check and a parity check are carried out in steps 120 and 121. In step 122, it is judged whether or not results of the checks are OK. If the results are not OK, the contents of the buffer memory 18 and six-digit memory 211 are cleared. If the results are OK, the step 123 is executed, and until the last data block of the buffer memory 18 is processed, the steps 105 and 123 are repeated. When the last block is processed, in step 124, it is judged whether the data memory R-4 or L-4 has data. If there is four-digit data, it means that the four-digit data erroneously exists in the data A when six-digit data are used. In step 125, therefore, the contents of the buffer memory 18, six-digit memory 211, and four-digit memory 21 are cleared, and the reading operation is repeated. Only when no data exists in the data memories R-4 and L-4 in the step 124, is a pair of six-digit data of the data memories R-6 and L-6 sent to the higher device.

In the above embodiment, the four-digit memory 21 and six-digit memory 211 are provided separately. It is possible, however, to store four-digit data and six-digit data in a single memory. In this case, addresses of regions for storing the for storing the four-digit data and six-digit data must be given in advance. According to the addresses of the region for six-digit data, the CPU 19 reads data, stores the data in the register 25, and carries out the above-mentioned comparison.

In the above embodiment also, the four-digit memory (or the four-digit storage region) and the six-digit memory (or the six-digit storage region) are provided, however, this arrangement does not limit the present invention. The numbers of four-digit data and six-digit data may be detected to judge whether or not a reading operation of a bar code is correct.

Figure 10:
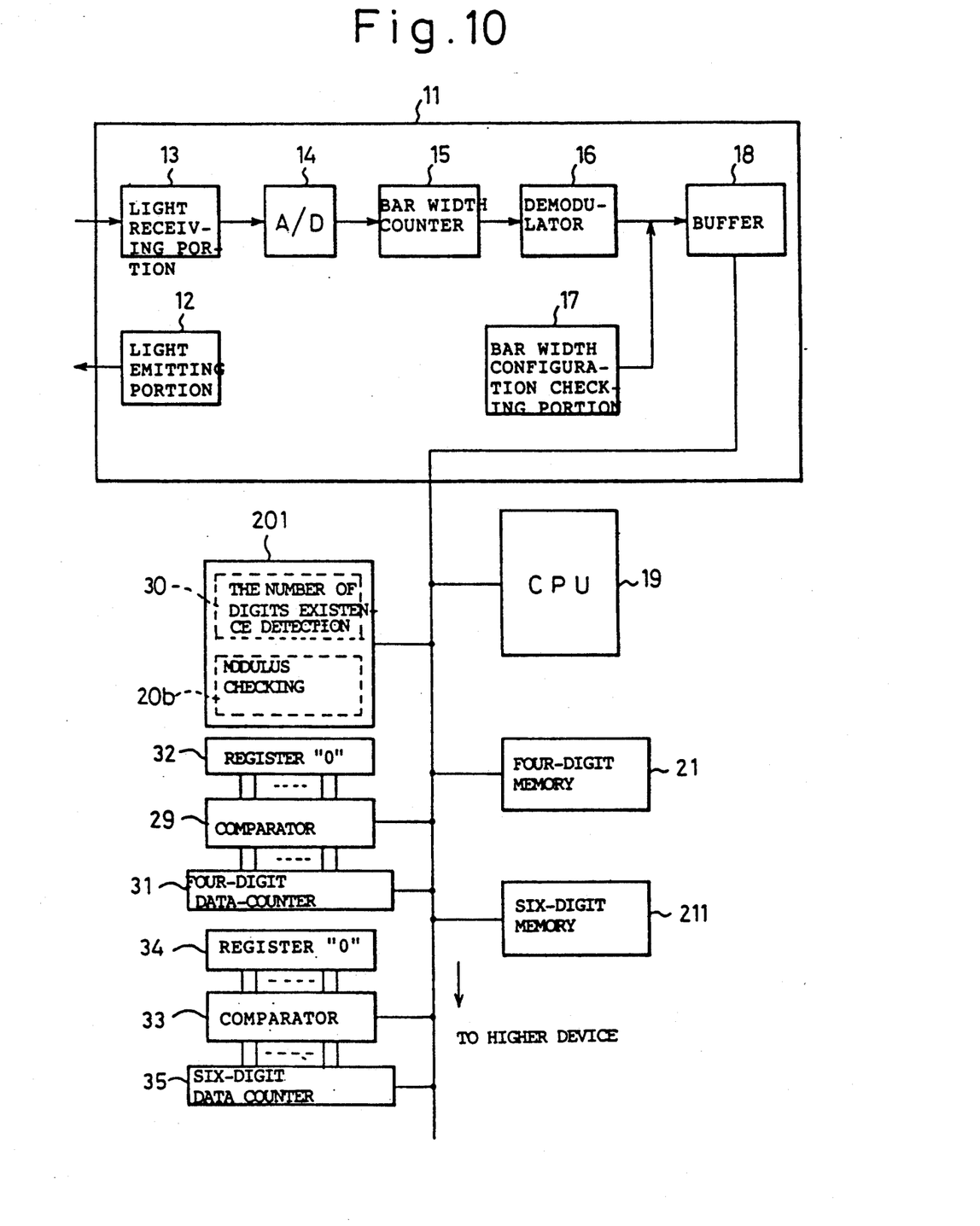
FIG. 10 is a block diagram showing another embodiment of the present invention.

Such an embodiment is shown in FIG. 10.

In FIG. 10, the same parts as those of the embodiment of FIG. 5 are represented by the same reference numerals. What is different from FIG. 5 is that a memory 201 stores a program 30 for detecting whether or not the numbers of digits exist, instead of the data existence detecting program 20 of FIG. 5, and that there are arranged registers 31, 32, 34, and 35, and comparators 29 and 33 for judging whether or not there are the numbers of four-digit data and six-digit data, instead of the registers 24, 25, 27, and 28, and the comparators 23 and 26 for judging whether or not there are four-digit data and six-digit data themselves.

An operation of the embodiment shown in FIG. 10 will be explained with reference to a flowchart of FIG. 11.

Figure 11A:
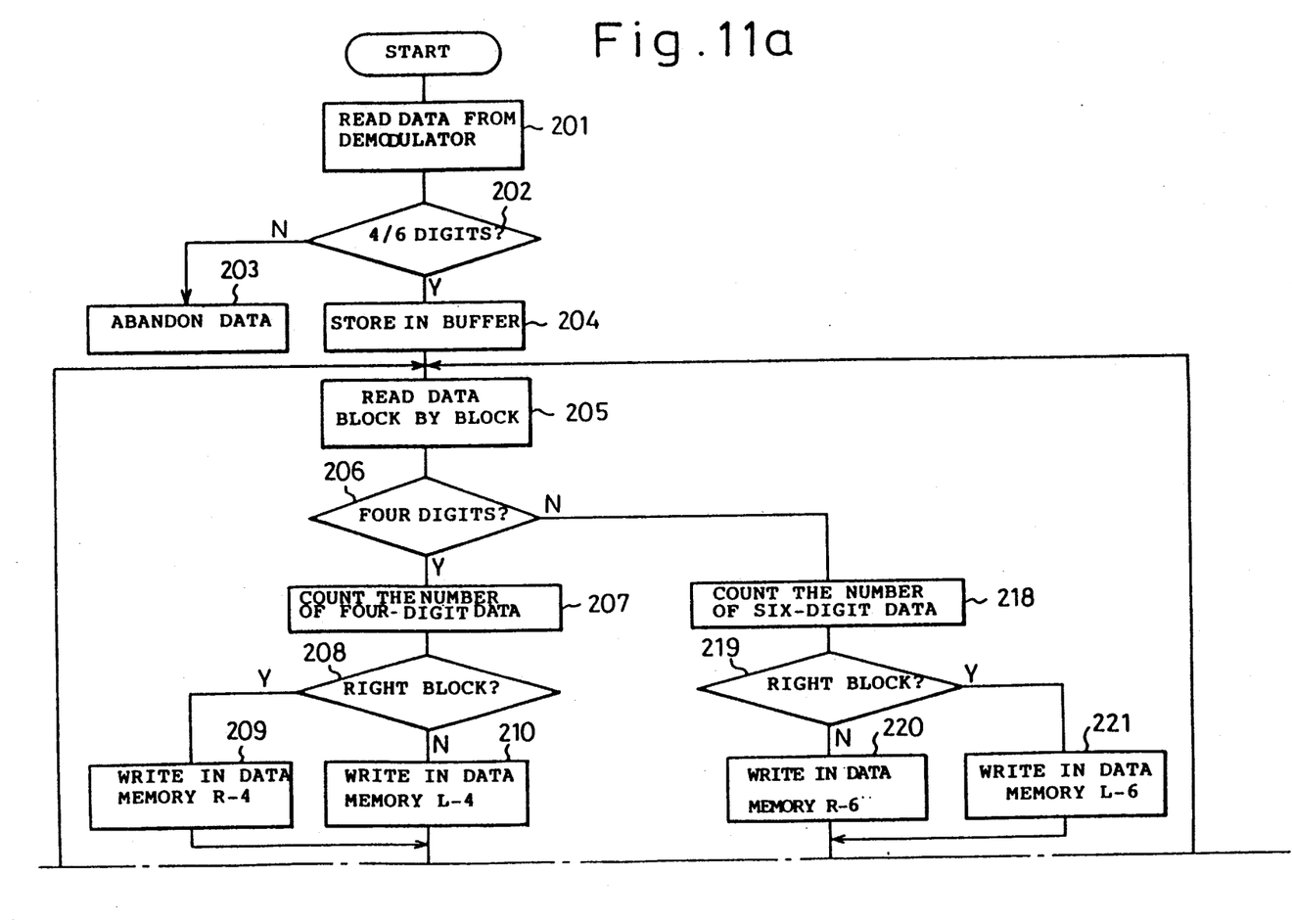
FIGS. 11a and 11b form a flowchart explaining an operation of a central processing unit shown in FIG. 10.
Figure 11B:
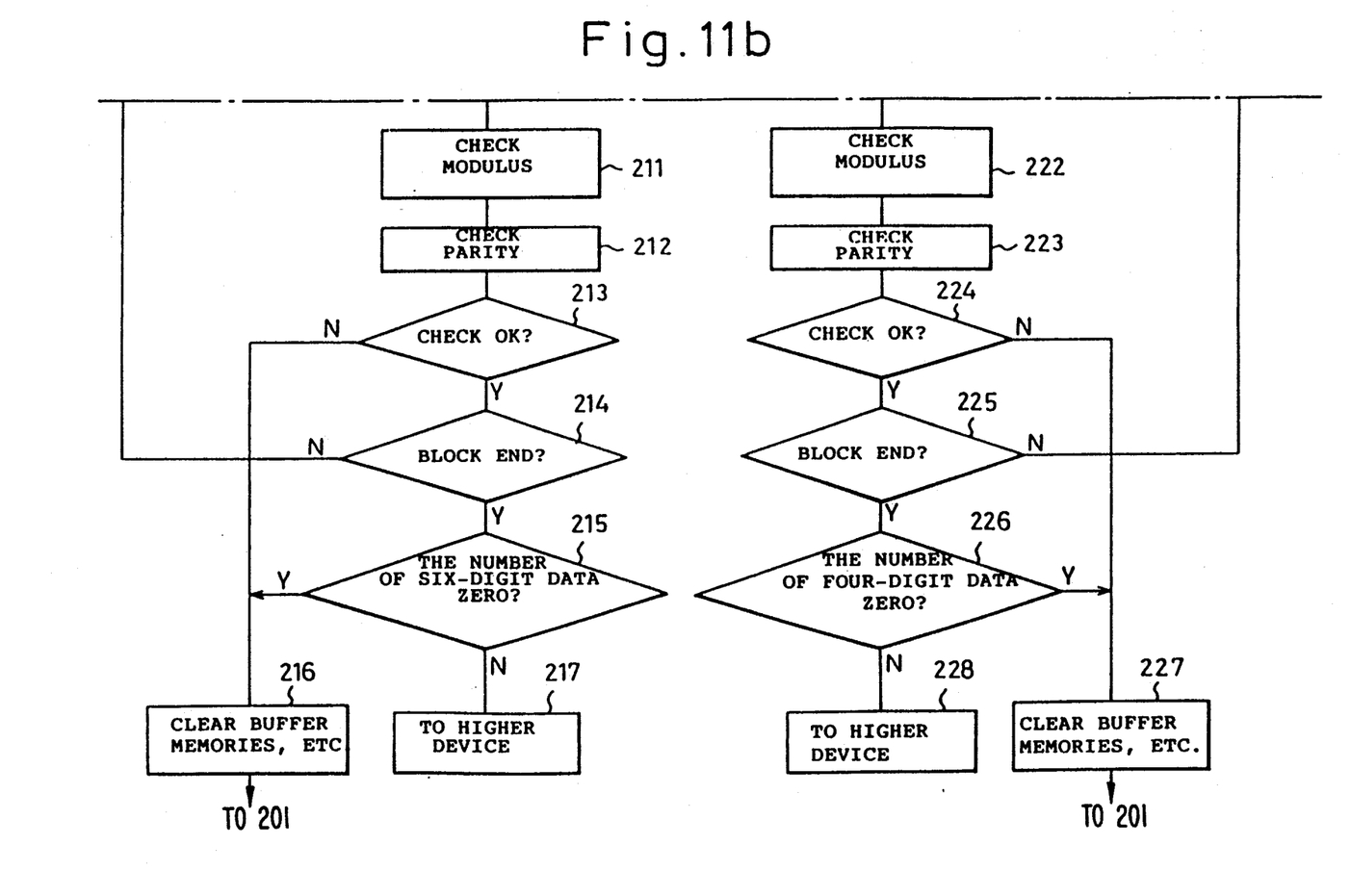

In FIG. 11, steps 201 to 206 are the same as the steps 101 to 106 of FIG. 9. In step 206, it is judged whether data has four digits or six digits, and in step 207 or 218, the number of data is counted. Steps 208 to 214, or steps 219 to 225 are the same as those of the steps 107 to 113, or steps 117 to 123 of FIG. 9. If the read data block has four digits in step 215, it is judged whether or not the six-digit data counter 35 is zero. If it is not zero, it is judged that the read data of the reading operation are wrong, and the buffer memory, etc., are cleared. Only when it is zero, the read data are informed to the higher device. Similarly, if the read data block has six digits, step 226 judges whether or not the value in the four-digit data counter 31 is zero. Only when it is zero, the read data are informed to the higher device.

The present invention can handle not only eight-digit and 13-digit bar codes but also bar codes of optional number of digits. Also, the number of blocks of a bar code is not limited to two as in the above embodiments.

As explained above, according to the present invention, the number of digits of read bar code data is detected, and according to the result of the detection, the bar code data is processed, thereby a read error rate of the bar code data is reduced.

I claim:

1. A bar code reading method comprising the steps of:
   (a) generating, in a single reading operation, plural pieces of bar block data corresponding to a bar code having a number of digits which is one of a plurality of predetermined standard values;
   (b) detecting the respective numbers of digits of said plural pieces of the bar block data;
   (c) storing said bar block data in storage regions corresponding to the plurality of predetermined standard values, based on the detected numbers of digits of the bar block data;
   (d) detecting whether or not the bar block data have been stored in two different storage regions; and
   (e) judging that the reading operation is erroneous if the bar block data are stored in the two different storage regions.

2. A bar code reading method as set forth in claim 1, wherein the bar block data generated in said step (a) includes left bar block data and right bar block data and wherein said step (a) comprises generating plural pieces of the left bar block data plural pieces of the right bar block data.

3. A bar code reading method as set forth in claim 2, wherein said step (c) comprises storing the bar block data in left and right bar block data storage regions corresponding to the plurality of predetermined standard values, based on the numbers of digits, according to the detected numbers of digits of the bar block data, and whether the generated bar block data are left block data or right block data.

4. A bar code reading method as set forth in claim 1, wherein said step (b) includes discarding the bar block data having the numbers of digits that do not match any of the plurality of predetermined standard values.

5. A bar code reading method as set forth in claim 1, wherein said step (a) includes storing the generated plural pieces of bar block data in a buffer memory.

6. A bar code reading method as set forth in claim 1, wherein said step (c) is followed by steps of carrying out a modulus 10 check and a parity check.

7. A bar code reading method as set forth in claim 5, further comprising steps of reading said plural pieces of bar block data from said buffer memory one by one and detecting its number of digits.

8. A bar code reading method as set forth in claim 7, wherein said step (c) is followed by a step of judging whether or not all the bar block data in the buffer memory have been read, and if the result of the judgment is NO, repeating said step of detecting the respective numbers of digits of the bar block data as well as said step (c) for storing the bar block data in the storage regions corresponding to the detected numbers of digits of the bar block data, and if the result is YES, executing said step (d) as well as said step (e).

9. A bar code reading method as set forth in claim 5, wherein said step (e) includes a step of clearing the contents of the buffer memory if it is detected that the bar block data are stored in the two different storage regions.

10. A bar code reading method as set forth in claim 5, further including steps of judging that the bar code reading operation is correct and outputting the read data if the bar block data are not stored in the two different storage regions.

11. A bar code reading method comprising:
(a) generating, in a single reading operation, plural pieces of bar block data corresponding to a bar code having a number of digits which is one of a plurality of predetermined standard values.
(b) detecting the respective numbers of digits of the plural pieces of the bar block data.
(c) counting the number of pieces of bar block data for each of the respective detected numbers of digits of the bar block data;
(d) detecting whether the number of pieces of bar block data having two different numbers of digits is greater than zero; and
(e) judging that the reading operation is erroneous is the number of pieces of bar block data having two different numbers of digits is greater than zero.

12. A bar code reading method as set forth in claim 11, wherein the bar block data generated in said step (a) includes left bar block data and right bar block data, and wherein said step (a) comprises generating plural pieces of the left and right bar block data.

13. A bar code reading method as set forth in claim 12, wherein said step (c) includes storing the bar block data in left and right bar block number storage regions corresponding to the plurality of predetermined standard values, based on the detected numbers of digits of the respective bar block data and whether the bar block data are left bar block data or right bar block data.

14. A bar code reading method as set forth in claim 11, wherein said step (b) includes discarding the bar block data having the numbers of digits that do not match any of the plurality of predetermined standard values.

15. A bar code reading method as set forth in claim 11, wherein said step (a) includes storing the plural pieces of bar block data in a buffer memory.

16. A bar code reading method as set forth in claim 13, wherein said step (c) is followed by steps of carrying out a modulus 10 check and a parity check.

17. A bar code reading method as set forth in claim 15, wherein said step (a) includes reading the plural pieces of bar block data from the buffer memory one by one and detecting the number of digits.

18. A bar code reading method as set forth in claim 17, wherein said step (c) is followed by steps of judging whether or not all the bar block data in the buffer memory have been read, and if the result of the judgment is NO, repeating said step (b) for detecting the respective numbers of digits of the bar block data as well as said step (c) for counting the numbers of the bar block data for the respective detected numbers of digits of the bar block data, and if the result is YES, executing said step (d) for detecting whether or not the numbers of bar block data having two different numbers of digits have been counted, as well as said step (e) for judging that the bar code reading operation is erroneous if the numbers of bar block data having two different numbers of digits have been counted.

19. A bar code reading method as set forth in claim 15, further including a step of clearing the contents of the buffer memory if the numbers of bar block data having two different numbers of digits have been counted.

20. A bar code reading method as set forth in claim 15, further including steps of judging that the bar code reading operation is correct and outputting the read data if two different numbers of bar block data greater than zero have not been counted.

21. A bar code reading apparatus comprising:
bar block data generating means for generating, in a single reading operation, plural pieces of bar block data corresponding to a bar code having a number of digits which is one of a plurality of predetermined standard values;
means for detecting the respective numbers of digits of said plural pieces of the bar block data obtained by said bar block data generating means;
a plurality of bar block data storage means corresponding to the standard values respectively; and
data existence detecting means for detecting whether or not at least two of the bar block data storage means have different bar block data,
each piece of the bar block data output from said bar block data generating means being stored in one of the bar block data storage means corresponding to the number of digits obtained at the output of said means for detecting the number of digits,
the bar code reading operation being judged to be erroneous if said data existence detecting means judges that at least two different bar block data storage means have bar block data.

22. A bar code reading apparatus as set forth in claim 21, wherein said bar block data storage means comprises:
first registers corresponding to respective numbers of digits, having a number of digits corresponding to the numbers of digits of the detected bar block data, for storing said bar block data;
second registers having the same number of digits, for storing all 0s; and
comparing means for the respective numbers of digits, said data existence detecting means detecting the existence of data by comparing the contents of the registers digit by digit.

23. A bar code reading apparatus as set forth in claim 21, wherein said means for detecting the numbers of digits includes means for discarding the bar block data having the numbers of digits that do not match any of the plurality of predetermined standard values.

24. A bar code reading apparatus as set froth in claim 21, wherein said bar block data generating means includes a buffer memory for storing the generated plural pieces of bar block data.

25. A bar code reading apparatus as set forth in claim 21, further comprising means for carrying out a modulus check and a parity check on the bar block data stored in said bar block data storage means.

26. A bar code reading apparatus as set forth in claim 24, wherein said means for detecting the respective numbers of digits reads the plural pieces of bar block data from said buffer memory one by one and detects the number of digits.

27. A bar code reading apparatus as set forth in claim 26, wherein said data existence detecting means has means for judging whether or not all the bar block data in the buffer memory have been read, means for causing, if a result of the judgment is NO, said means for detecting the respective numbers of digits of the bar block data to detect the respective number of digits and said plural bar block data storage means to store the bar block data in storage regions corresponding to the detected numbers of digits of the bar block data,
means for causing said data existence detecting means to detect, if the result is YES, whether or not two different ones of the storage regions have bar block data, and means for judging that the bar code reading operation is wrong if the two different storage regions have bar block data.

28. A bar code reading apparatus as set forth in claim 24, further comprising means for clearing the contents of said buffer memory if said two different storage regions have bar block data.

29. A bar code reading apparatus as set forth in claim 24, further comprising means for judging that the bar code reading operation is correct and informing the read data to a higher device if the two different storage regions do not have bar block data.

30. A bar code reading apparatus comprising:
bar block data generating means for generating, in a single reading operation, plural pieces of bar block data corresponding to a bar code having a number of digits which is one of a plurality of predetermined standard values;
means for detecting the respective numbers of digits of said plural pieces of the bar block data obtained by said bar block data generating means;
a plurality of counting means provided corresponding to said plurality of standard values respectively, for counting the numbers of bar block data; and
storage means for storing the numbers of bar block data respectively counted by said counting means;
means for detecting whether or not at least two different of said plurality of counting means have the number of bar block data,
wherein the numbers of the bar block data output from said bar block data generating means are stored in said storage means for storing the numbers of bar block data respectively, counted by said means for detecting the existence of the numbers of digits,
the reading operation of the bar code is judged to be wrong if said means for detecting the existence of the numbers of digits judges that the numbers of digits for at least two pieces of bar block data counted by said counting means, are different.

31. A bar code reading apparatus as set forth in claim 30, wherein said means for counting the numbers of bar block data comprises:
registers corresponding to the respective numbers of digits, for storing the numbers of bar block data according to the detected numbers of digits of the bar block data;
registers for storing 0s; and
comparing means, said means for detecting the existence of the numbers of digits detecting the existence of different numbers of digits by comparing the contents of the registers for every number of digits.

32. A bar code reading apparatus as set forth in claim 30, wherein said means for detecting the existence of the numbers of digits includes means for discarding the bar block data having the numbers of digits that do not match any of the plurality of predetermined standard values.

33. A bar code reading apparatus as set forth in claim 30, wherein said plurality of bar block data generating means includes a buffer memory for storing the generated plural pieces of bar block data.

34. A bar code reading apparatus as set forth in claim 30, further comprising means for carrying out a modulus check and a parity check on the bar block data output from said bar block data generating means.

35. A bar code reading apparatus as set forth in claim 33, wherein said means for detecting the numbers of digits reads the plural pieces of bar block data from said buffer memory one by one and detect its number of digits.

36. A bar code reading apparatus as set forth in claim 35, wherein said means for detecting the existence of the numbers of digits has means for judging whether or not all the bar block data in said buffer memory have been read, further comprising:
means for causing, if a result of the judgment is NO, said means for detecting the respective numbers of digits of the bar block data to detect the respective numbers of digits and said counting means to count the number of bar block data for each of the detected numbers of digits of the bar block data,
means for detecting, if the result is YES, whether or not the numbers of two different kinds of bar block data have been counted, and
means for judging that the bar code reading operation is wrong is the numbers of the two different kinds of bar block data have been counted.

37. A bar code reading apparatus as set forth in claim 33, further comprising means for clearing the contents of said buffer memory if the numbers of the two different kinds of bar block data have been counted.

38. A bar code reading apparatus as set forth in claim 33, further comprising means for judging that said bar code reading operation is correct and outputting the read data if the numbers of the digits counted for one of the two different kinds of bar block data is zero.

* * * * *

UNITED STATES PATENT AND TRADEMARK OFFICE
CERTIFICATE OF CORRECTION

PATENT NO. : 5,189,289  
DATED : FEBRUARY 23, 1993  
INVENTOR(S) : MITSUO WATANABE

Page 1 of 2

It is certified that error appears in the above-indentified patent and that said Letters Patent is hereby corrected as shown below:

Col. 1, line 8, "apparatus." should be --apparatus. More particularly, the present invention relates to a method and apparatus for distinguishing labels of, for example, the EAN-8 and EAN-13 type.--;

lines 28-30, delete lines in their entirety;

line 42, "view" should be deleted.

Col. 2, line 61, "21N1" (second occurrence) should be --21Nℓ--;

line 65, "N1" (second occurrence) should be --Nℓ--.

Col. 3, line 1, "or 1" should be --or ℓ--;  
line 2, "21N1." should be --21Nℓ.--;  
line 8, "..., 1)" should be --... ℓ)--.

Col. 5, line 1, "of way" should be --of the way--.

Col. 7, line 20, "for storing the" (second occurrence) should be deleted.

Col. 8, line 27, "data plural" to --data and plural--.

UNITED STATES PATENT AND TRADEMARK OFFICE
CERTIFICATE OF CORRECTION

PATENT NO. : 5,189,289
DATED : FEBRUARY 23, 1993
INVENTOR(S) : MITSUO WATANABE

It is certified that error appears in the above-indentified patent and that said Letters Patent is hereby corrected as shown below:

Col. 9, line 16, "is" (second occurrence) should be --if--.

Col. 11, line 31, "number" should be --numbers--.

Col. 12, line 40, "is wrong is" should be --is wrong if--.

Signed and Sealed this

Twenty-second Day of March, 1994

Attest:

BRUCE LEHMAN

Attesting Officer          Commissioner of Patents and Trademarks